(12) United States Patent
Mayer et al.

(10) Patent No.: US 6,187,179 B1
(45) Date of Patent: Feb. 13, 2001

(54) OUTSIDE FILTER, IN PARTICULAR FOR AQUARIUM

(75) Inventors: Ferdinand Mayer, Schwaebisch-Gmuend; Walter Wiedenmann, Deizisau, both of (DE)

(73) Assignee: Eheim GmbH & Co. KG, Deizisau (DE)

(*) Notice: Under 35 U.S.C. 154(b), the term of this patent shall be extended for 0 days.

(21) Appl. No.: 09/281,513

(22) Filed: Mar. 30, 1999

(30) Foreign Application Priority Data

Mar. 31, 1998 (DE) .............................................. 198 14 323
Feb. 3, 1999 (EP) .................................................. 99102126

(51) Int. Cl.[7] .......................... B01D 35/157; B01D 35/30
(52) U.S. Cl. .......................... 210/109; 210/169; 210/238; 210/416.2; 210/472; 220/345.1; 417/199.2; 417/435
(58) Field of Search .............................. 210/97, 120, 109, 210/110, 136, 169, 232, 237, 238, 416.2, 436, 472; 417/199.2, 324, 435; 119/259–261; 220/200, 212, 231, 345.1, 345.5

(56) References Cited

U.S. PATENT DOCUMENTS

| 1,760,888 | 6/1930 | Shield . | |
|---|---|---|---|
| 3,297,187 | 1/1967 | Thiesen . | |
| 3,669,297 | 6/1972 | Willinger | 210/169 |
| 4,895,646 | 1/1990 | Willinger | 210/169 |
| 5,154,821 | * 10/1992 | Reid | 210/416.2 |
| 5,474,674 | 12/1995 | Bresolin et al. | 210/169 |
| 5,567,315 | * 10/1996 | Weidemann et al. | 210/416.2 |
| 5,728,293 | * 3/1998 | Guoli et al. | 210/416.2 |
| 5,750,023 | 5/1998 | Pettenon | 210/169 |

FOREIGN PATENT DOCUMENTS

| 93 11 993 | 11/1993 | (DE) . |
| 44 10 561 A1 | 9/1995 | (DE) . |
| 197 32 922 A1 | 4/1998 | (DE) . |
| 0 738 533 A2 | 10/1996 | (EP) . |

* cited by examiner

*Primary Examiner*—Joseph W. Drodge
(74) *Attorney, Agent, or Firm*—Michael J. Striker (57) ABSTRACT

An outside filter for an aquarium has a housing having an inner chamber, a removable cover for closing the inner chamber of the housing, a supply conduit for supplying water to be filtered into the inner chamber of the housing, a withdrawal conduit for withdrawing the water from the inner chamber of the housing, a motor-operated pump for withdrawing the filtered water, a device for producing a vacuum for aspirating water with air which is contained in the supply conduit during a displacement, the inner chamber of the housing together with the discharge conduit forming a system which communicates with the supply conduit and during the production of the vacuum is hermetically sealingly closed from outside and serves as an evacuatable pressure chamber, the device for producing the vacuum inside the system which is closed.

56 Claims, 10 Drawing Sheets

OUTSIDE FILTER, IN PARTICULAR FOR AQUARIUM

BACKGROUND OF THE INVENTION

The present invention relates to an outside filter, in particular for an aquarium.

In such outside filters, the motor operated pumps are not self-aspirating. The reason is that during certain conditions, for example when the pump is turned off, the water supply through the supply conduit to the pump chamber which accommodates the impeller of the pump is interrupted, and air is supplied in and then during subsequent turning on the pump can not transport water. Filter devices are known, which are provided with a device for producing a vacuum which operates when needed and therefore water can be aspirated in the air which is contained in the supply conduit with displacement. These devices are composed for example of a hand pump provided with a flexible bellows and various valves and conduits. The handling of such devices is partially very expensive and not practical.

SUMMARY OF THE INVENTION

Accordingly, it is an object of the present invention to provide an outside filter of the above mentioned general type in which the production of a vacuum is simplified and aspirational water in the supply conduit is provided.

In keeping with these objects and with others which will become apparent herein after, one feature of present invention resides, briefly stated, in an outside filter, in which a system which is composed of a housing inner chamber and a connected withdrawal conduit and communicating with a supply conduit is sealingly closed during the production of the vacuum from outside and operates from an evacuatable pressure chamber, and the device produces the vacuum inside this closed system.

When the outside filter is designed in accordance with the present invention, it avoids the disadvantages of the prior art and provides for the above mentioned highly advantageous results.

In accordance with another advantageous feature of the present invention, the device for production of a vacuum is formed of parts of the outside filter. This ensures an especially simple construction, since for production of a vacuum the parts of the outer filter are used and no additional elements are needed.

In accordance with a further embodiment of the present invention, the outside filter has an actuating device engaging the cover, with which the cover is openable with removal of the sealing condition preferably to a manual lifting and is movable outwardly of the housing, and is closeable in an opposite direction after placement with providing the sealing condition and movable in the housing as well as heldable in the closing position. With this design, the handling of the outside filter with regard to the releasing and the removing of the cover from the housing is substantially simplified.

In accordance with still a further advantageous feature of the present invention, the actuating device operates simultaneously for raising and/or at least insignificant inclination, for example tilting, of the cover for the production of the vacuum. Thereby the actuating device which operates for handling of a cover simultaneously in a simple manner is also operable for actuating the device for production of a vacuum formed of the parts of the outside filter, for example the cover is lifted relative to the housing and/or at least insignificantly inclined.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
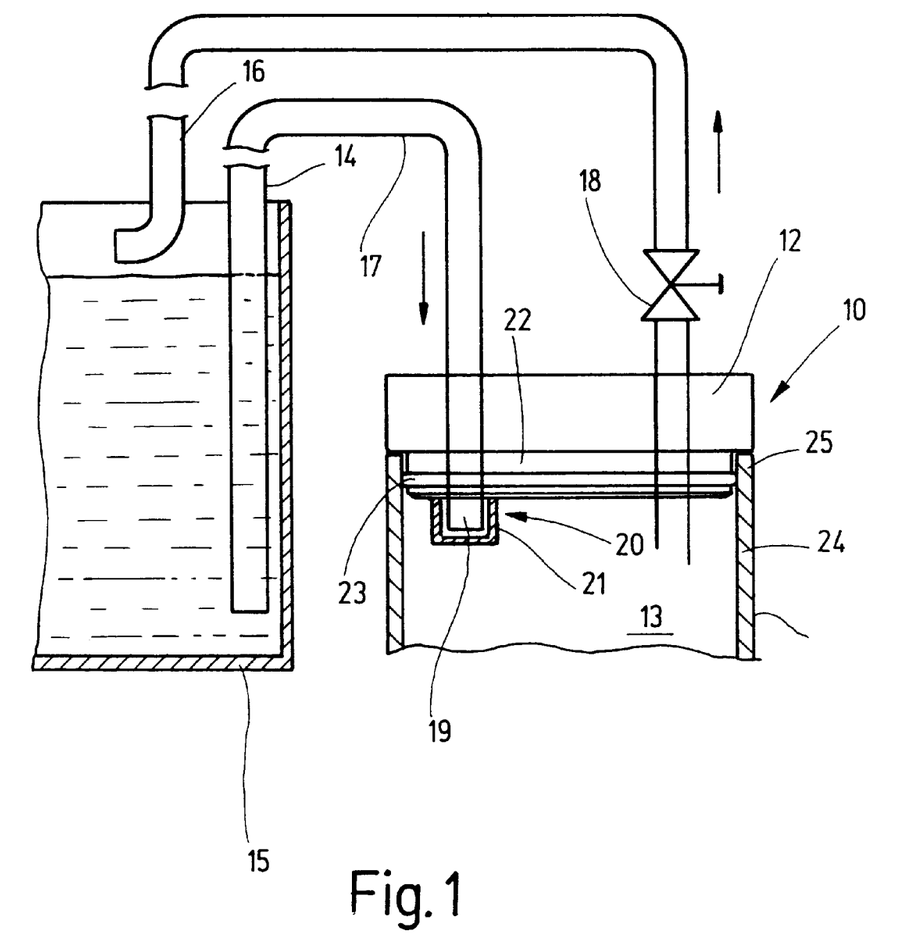
FIG. 1 is a schematic, partially sectioned side view of a part of an outside filter and an aquarium in accordance with a first embodiment of the present invention.
Figure 2:
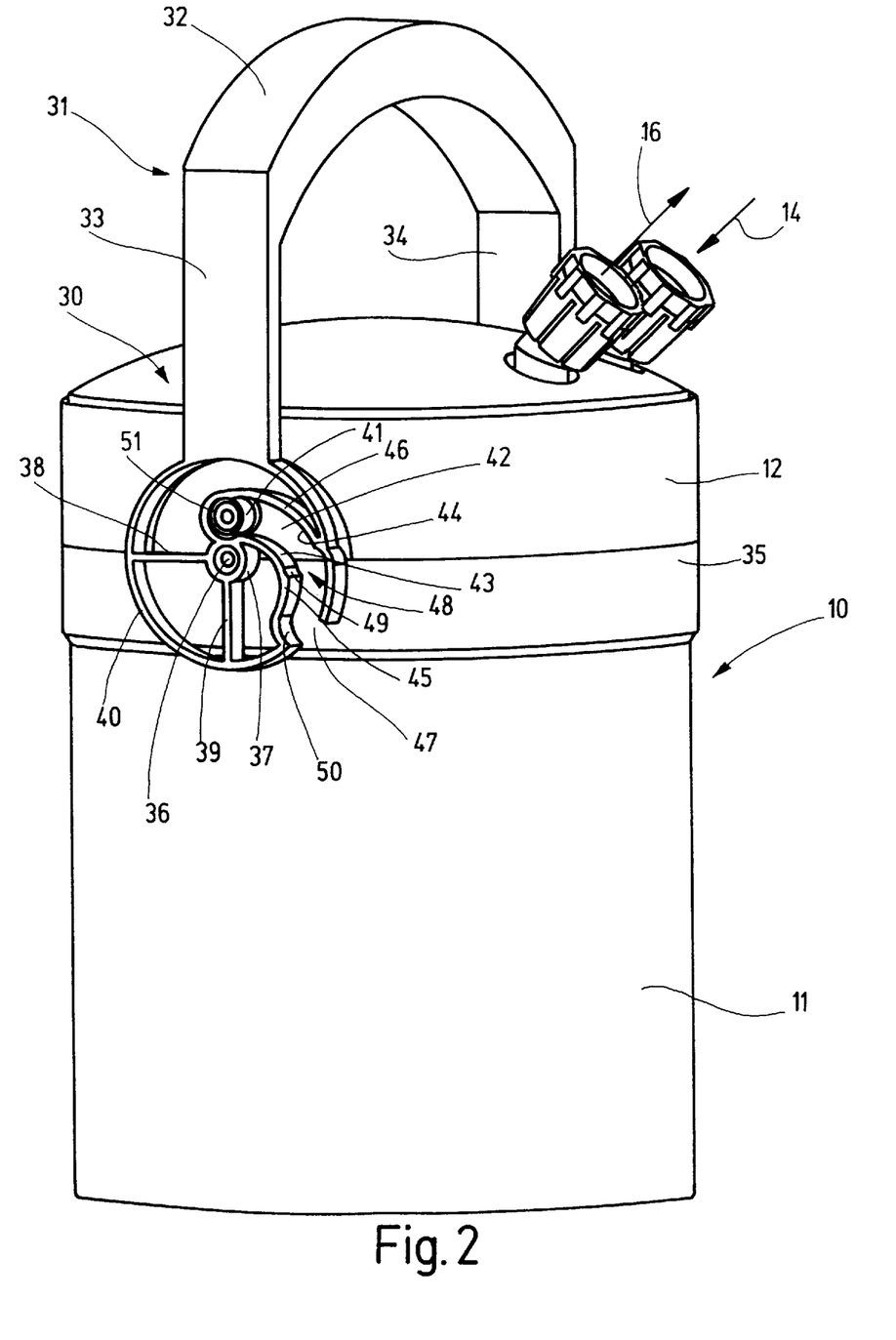
FIG. 2 is a schematic perspective view of an outside filter in accordance with a second embodiment, with a cover located in a closing position and a bracket located in an initial position.

A basic principle of the outside filter in accordance with the present invention is illustrated in FIG. 1. FIGS. 1 and 2 show schematically a part of an outside filter 10, in particular for aquariums, which has for example a cylindrical housing 11 with an upper, removable cover 12 for closing of an inner chamber 13 of the housing 11. Water is supplied into the inner chamber 13 through a schematically indicated supply conduit 14 from an aquarium tank 15, and guided back into the aquarium tank 15 through a discharge conduit 16. The cover 12 is for example designed as a pump head which contains a motor-operated pump (not shown) for transportation of the water.

A suitable filter material is accommodated in a conventional manner in the housing 11. The water supplied through the supply conduit 14 passes through the filter material 4 for filtering, so that the water which is supplied back through the discharge conduit 16 into the aquarium tank 15 is filtered.

The motor-driven pump located in the cover 12 is not self-aspirating. Therefore there is a problem that the system which is composed of the inner chamber 13 and the connected discharge conduit 16 and communicating with the supply conduit 14 can contain air during interruption of the fluid flow, and thereby a portion 17 of the supply conduit 14 which has an inverted U-shape and is connected with the cover 12 contains no water. During start of the pump, it is then not in the position to aspirate water through the supply conduit 14. A device for producing a vacuum which is actuated when needed provides an assistance in this situation. With this device the air contained in the supply conduit 14 with displacement aspirates water, so that the pump chamber which accommodates the impeller of the pump is filled with water which flows thereafter from the supply conduit 14.

The novelty of the outside filter 10 in accordance with the present invention is that the system which is composed of the inner chamber 13 and the connected discharge conduit 16 and communicates with the supply conduit 14 is hermetically sealingly closed from outside during the production of the vacuum and serves as an evacuatable pressure chamber, and the evacuating device produces the vacuum inside this closed system. This device can produce the vacuum inside the inner chamber 13 and/or the supply conduit 14 or also inside the discharge conduit 16.

The discharge conduit 16 at one point, for example near the cover 12 or integrated in it, has a schematically shown valve 18. The valve 18 is for example actuatable manually or is composed instead of a self-acting valve, for example a check valve. The valve 18 operates so that first it is located in a closed position when the evacuating device for aspiration of the water is actuated in the U-shaped portion 17. When the aspirated water flows into the portion 17 and into the inner chamber 13, the valve 18 opens to maintain the flow action.

FIG. 1 schematically shows a part of the supply conduit 14 provided in the cover 12. This part opens with its end at a suitable point freely into the inner chamber 13, as schematically shown for example for the portion 19. This part of the supply conduit 14 which extends in the cover 12 has an outlet, for example an outlet of the schematically shown portion 19 facing the inner chamber 13, with a valve 20. This valve after aspiration of water in the supply conduit blocks an opposite return flow of the water with air aspiration. FIG. 1 shows a schematically illustrated accumulating container 21 for water as the valve 20 in which the outlet of the portion 19 opens. It is to be understood that the valve 20 can be designed in different ways as well.

In the not shown embodiment the device for producing a vacuum has a suction pump, for example a bellows pump, a piston pump or the like, which communicates by its suction side with a system composed of the inner chamber 13 and a portion of the discharge conduit 16 extending to the valve 18 which system communicates with the supply conduit 14. For aspiration of water through the U-shaped portion 17, first a valve 18 is closed and the suction pump is actuated. With the suction pump the above described system aspirates water through the U-shaped portion 17 to the cover 12 and into the inner chamber 13, and the valve 18 is open to maintain the water flow.

In the shown embodiment, the device producing a vacuum is formed of parts of the outer filter 10, which is especially simple. For this purpose at least a part of the cover 12 or the whole cover is movable relative to the housing 11 for producing the vacuum in form of the above described pump head, for example as a piston of a pump. In a simple manner the whole cover 12 can be liftable and/or tiltable relative to the housing 11.

In accordance with another not shown embodiment, instead of this, at least a part of the housing 11 can be movable relative to another part of the housing 11 and/or the cover 12 for producing a vacuum.

FIG. 1 schematically shows that the cover 12 has a portion 22 of a smaller diameter which carries a seal 23, for example an O-ring, and extends with this portion into the interior of the housing 11. It further shows that the wall 24 of the housing 11 contains a ventilation opening 25 at a location in the region of the upper end. The ventilation opening 25 is provided at a distance above the seal 23. In this case the valve 18 is not needed, since during lifting and/or tilting of the cover 12 a part of the cover 12 in its position for producing the vacuum ventilates the inner chamber 13 through the ventilating opening 25 outwardly, when during lifting and/or tilting of the cover 12 upwardly the seal 23 reaches the region of the ventilating opening 25. The lifting stroke of the cover 12 until it reaches its ventilation corresponds substantially to the piston stroke of a piston pump. It is dimensioned so that after passage of the piston stroke, the aspirational water through the U-shaped portion 17 is performed and then the water flows in, the ventilation opening 25 is released and the inner chamber 13 is ventilated outwardly through it.

Figure 3:
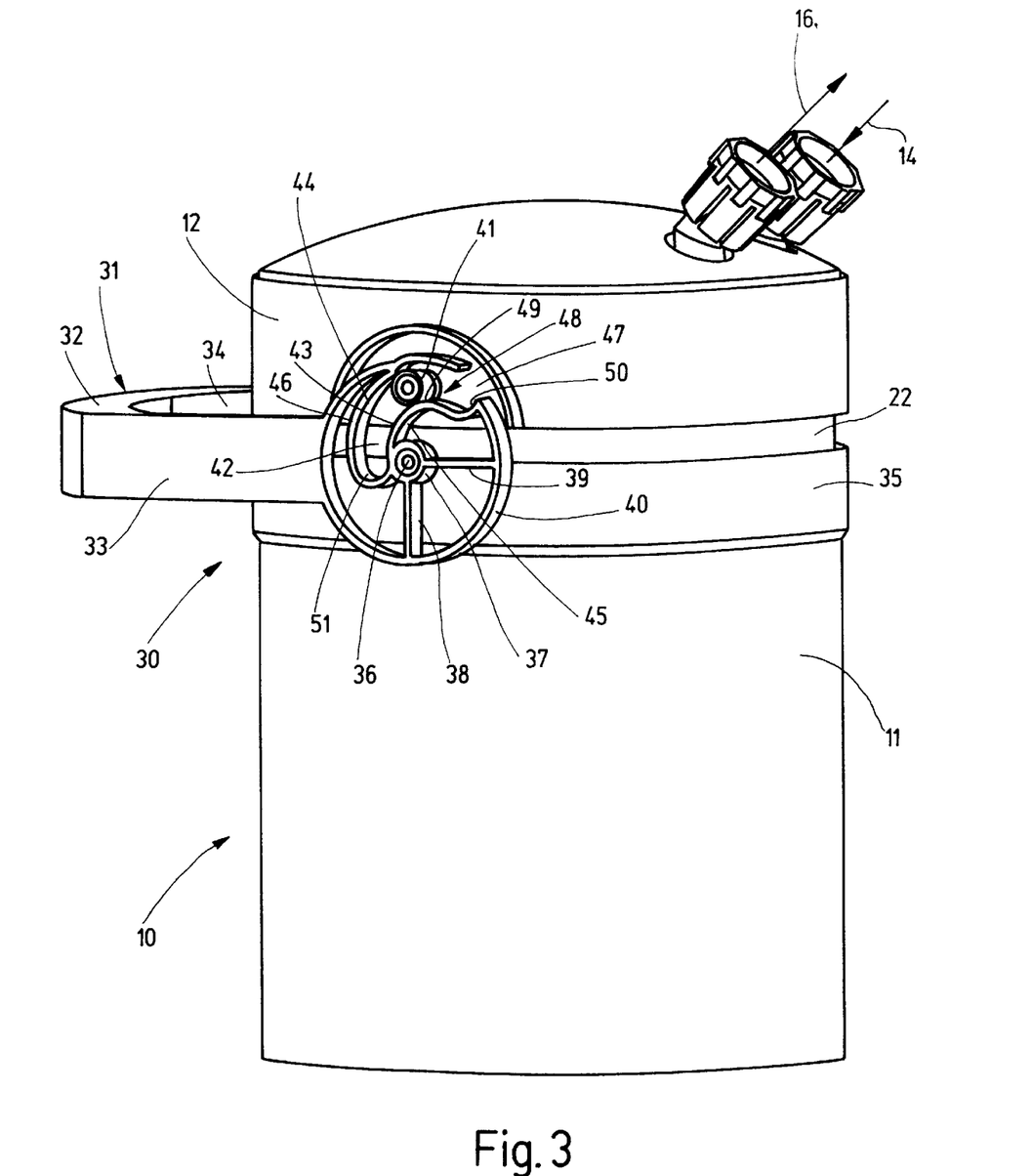
FIG. 3 is a schematic perspective view of the outside filter of FIG. 2, but in another position of the cover and a first end position of the bracket.

FIGS. 2 and 3 show a second embodiment of the present invention in which the parts corresponding to the parts of the first embodiment are identified with the same reference numerals, to avoid a repetition of the description of the first embodiment.

In FIGS. 2 and 3 from the supply conduit 14 and the discharge conduit 16 which are schematically shown by arrows, only a connection pipe is provided on the cover 12 for connection of the corresponding conduits. The parts of the supply conduit 14 and the discharge conduit 16 located inside the cover 12 are not illustrated.

The outside filter 10 has an actuating device 30 which can engage the cover 12. It is open by the cover 12 with lifting of the sealing condition in accordance with FIG. 1 to a removable end position for a manual lifting and can move outwardly of the housing 11, and is closeable by the cover 12 in the opposite direction after placement with providing the sealing condition and is movable in the housing 11 as well as holdable in this closing position.

The actuating device 30 has a bracket or lever 31 which has a substantially inverted U-shape, with an upper part 32 and side brackets or legs 33 and 34. The bracket 31 is turnably supported on the upper edge 35 of the housing 11 for turning about a horizontal turning axis 36 extending diametrically with regard to the cylindrical housing 11. The bracket 31 is dimensioned so that it engages the cover 12 at a distance. For supporting about the turning axis 36, an axial pin is provided on the housing 11 and a bearing sleeve 37 is provided on the axial pin and forms a rigid component of the bracket 31. FIGS. 2 and 3 show only a bearing sleeve 37 of the leg 33, while the other leg 34 is supported in the same way. The bearing sleeve 37 is connected through spokes 38 and 39 and a ring part 40 with the bracket 31, and in particular with its leg 33. The bracket 31 is composed for example of a one-piece synthetic plastic part and is placed with the bearing sleeve 37 on the associated axial pin. The cover 12 is completely removable when needed. The bracket 31 simultaneously forms a handle for carrying the whole outside filter 10.

Transmission means are provided between the housing 11 and the cover 12. With this means it is possible to lift or lower and/or to incline within certain limits the cover 12 by turning of the bracket 31 about the turning axis 36.

This transmission means in accordance with a second embodiment shown in FIGS. 2 and 3 include two-side cams 41 formed as rollers and coulisse tracks 42 associated with the cam 41 and engaging or engageable with one another. FIGS. 2 and 3 show however only the side of the leg 33 of the transmission means. It is to be understood that similarly to this, the other side associated with the leg 34 can be provided with the same transmission means. Each coulisse track 42 associated with the cam 41 has a lifting curve 43 and a lowering curve 44 at a distance from it. The cam 41, depending on the turning position of the bracket 31, is engaged or engagageable with the corresponding curve. The lifting curve 43 and the lower curve 44 is formed by a substantially arcuate web 45 and 46, which is a fixed component of the bracket 31. The web 45 extends from the bearing sleeve 37 to the ring part 40. The web 46 extends also substantially from the bearing sleeve 47 to the ring part 40. The latter at the end and between both webs 45, 46 has an opening 47 for insertion of the cam 41. At this location, a corresponding intermediate space is formed between the corresponding end of the web 45 and 46 with the lifting curve 43 and the lowering curve 44. It is sufficiently great so that the curve 41 can pass between them.

In the shown embodiments of FIGS. 2 and 3, the webs 45, 46 with the lifting curve 43 and the lowering curve 44 are arranged on the bracket 41 and the cam 45 on the cover 12. It is to be understood that in accordance with another not shown embodiment the location of the corresponding elements can be kinematically reversed.

In the shown construction the actuating device 30 on the one hand serves for simply and easily releasing the cover 12 when it is removed from the housing 11 with lifting of the contact in the seal 23 and the wall 24 of the housing 11 as shown in FIG. 1. In the process the closing position (FIGS. 1 and 2) leads to a fixed adherence between the seal 23 and the wall 24, which can be relatively difficult to overcome manually. By turning of the bracket 31, starting from the initial position in FIG. 2, around the turning axis 36 in a counterclockwise direction, a lifting of the cover 12 and/or tilting with smaller inclined position is possible, until the first end position of the bracket 31 shown in FIG. 3 is reached after 90° turning angle, and until the upwardly displaced position of the cover 12 which after lifting and/or tilting of the cover 12 with production of the vacuum is provided without lifting the sealing condition between the cover 12 and the housing 11 in FIG. 3. The turning action of the bracket 31 serves thereby simultaneously for producing the vacuum in the inner chamber 13 by lifting of the cover 12 relative to the housing 11 and thereby increasing the volume in the interior of the outside filter 10.

The actuating device 30 has an elasting device 44 for arresting the bracket 31 in the first end position shown in FIG. 3. In the shown embodiment, the arresting device 48 is formed by an over-arrestable abutment 49, for example in form of a raised portion which forms the lifting curve 43. When the lever 31 is turned from the initial position shown in FIG. 2 to the first end position shown in FIG. 3, the abutment 49 strikes against the cam 41. Thereby it forms a signal for the operator that the turning movement for producing of the vacuum in the inner chamber 13 is finished and further turning movement of the bracket 31 in the same turning direction over the first end position leads to lifting of the sealing condition.

The actuating device 30 is provided for example at an end of the lifting curve 43 with a first end abutment 50. It is formed as an increased curvature of the web 45 for blocking the bracket 31 in a second end position extending outwardly beyond the first end position shown in FIG. 3. It corresponds to the end position of the cover 12 in which it is ready to be removed and which follows the lifting and/or tilting of the cover 12.

The actuating device 30 further has a second end abutment 51 at the end of the coulisse track 42, for example at the end of the webs 45 and 46 which transit into one another. The second end abutment 51 is formed by a curvature which connects both webs 45, 46. The bracket 31 is blocked by the second end abutment 51 in its initial position shown in FIG. 2 which corresponds to the closing position of the cover 12.

As can be seen, in the second embodiment shown in FIGS. 2 and 3, the bracket 31, starting from its initial position in FIG. 2 is turnable in a turning direction corresponding to a counterclockwise direction first with first end position shown in FIG. 3, to produce a vacuum in the inner chamber 13 and to aspirate air and water. From this first end position in accordance with FIG. 3 it is turnable outwardly in the same turning direction in a second end position which is not shown and is limited by abutment of the first end abutment 50 against the cam 41. In the second end position of the bracket 31, the opening 47 is open so that during a further vertical movement of the cover 12 upwardly, the corresponding cam 41 exits from the associated coulisse track 42. When the removed cover 12 is again placed in the opposite direction on the housing 11, the cam 41 at this location is introduced through the opening 47 into the associated coulisse track 42 between the webs 45, 46.

An oppositely directed turning movement of the bracket 31 in a clockwise direction from the second end position leads to the engagement of the lifting curve 44 on the corresponding cam 41 and thereby drawing of the cover 12 with its projection 22 in the housing 11. This turning position of the bracket 31 is limited by the abutting of the second end abutment 51 against the cam 41, and then the bracket 31 assumes the initial position shown in FIG. 2. The bracket 31 is thereby turnable over a turning angle which is greater than 90° from the initial position shown in FIG. 2 to the first end position shown in FIG. 3 by approximately 90° and starting from the first end position shown in FIG. 3 to the not shown second end position again substantially for example by 45°, so that total turning angle can amount for example to 135°.

The third embodiment differs from the second embodiment by a different design of the coulisse track 42 which extends over a greater turning angle of the bracket 31.

Figure 4:
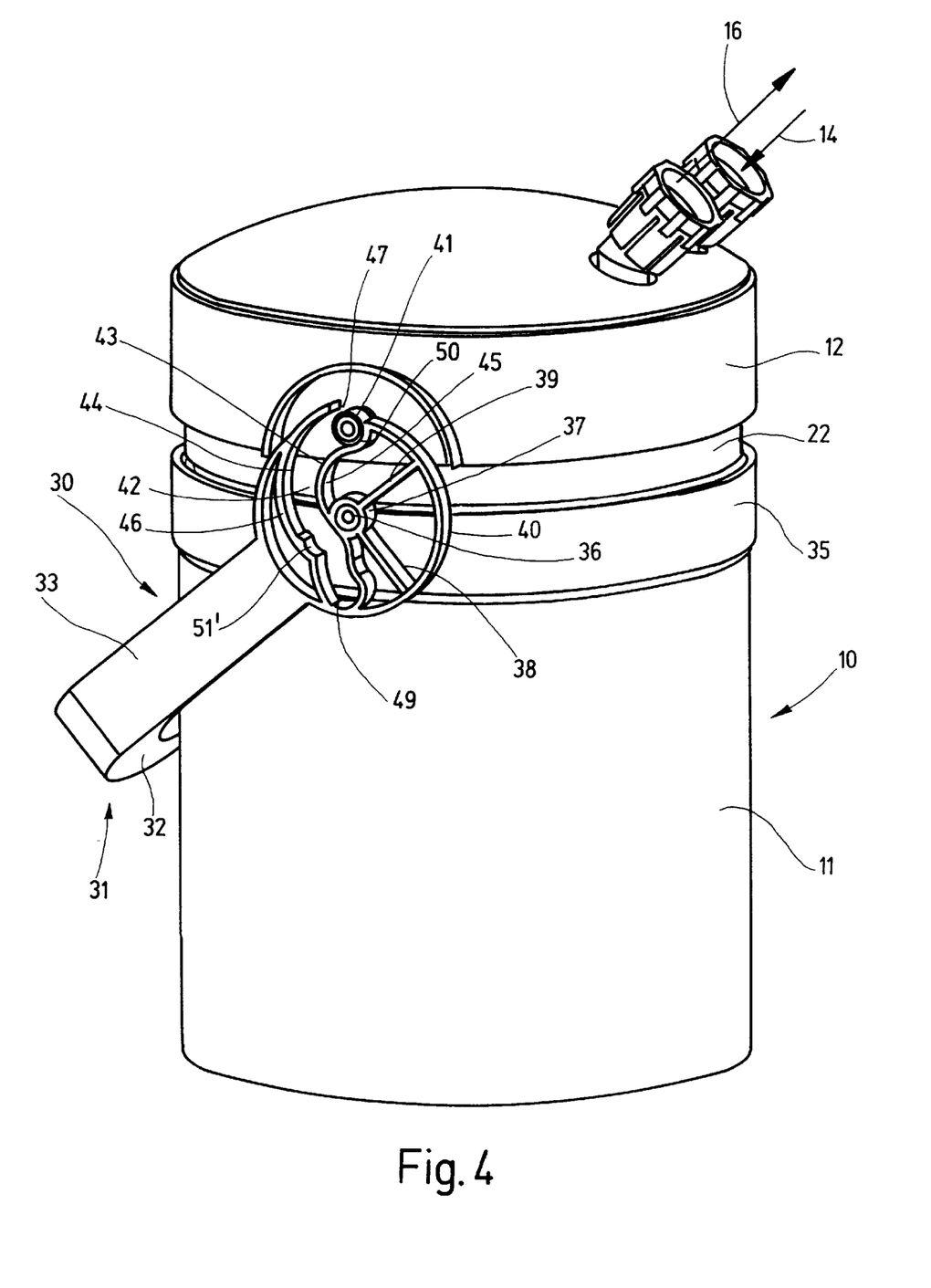
FIG. 4 is a schematic perspective view of an outside filter in accordance with a third embodiment of the present invention, in which the cover is in its end position ready to be removed and the bracket is in its second end position.
Figure 5:
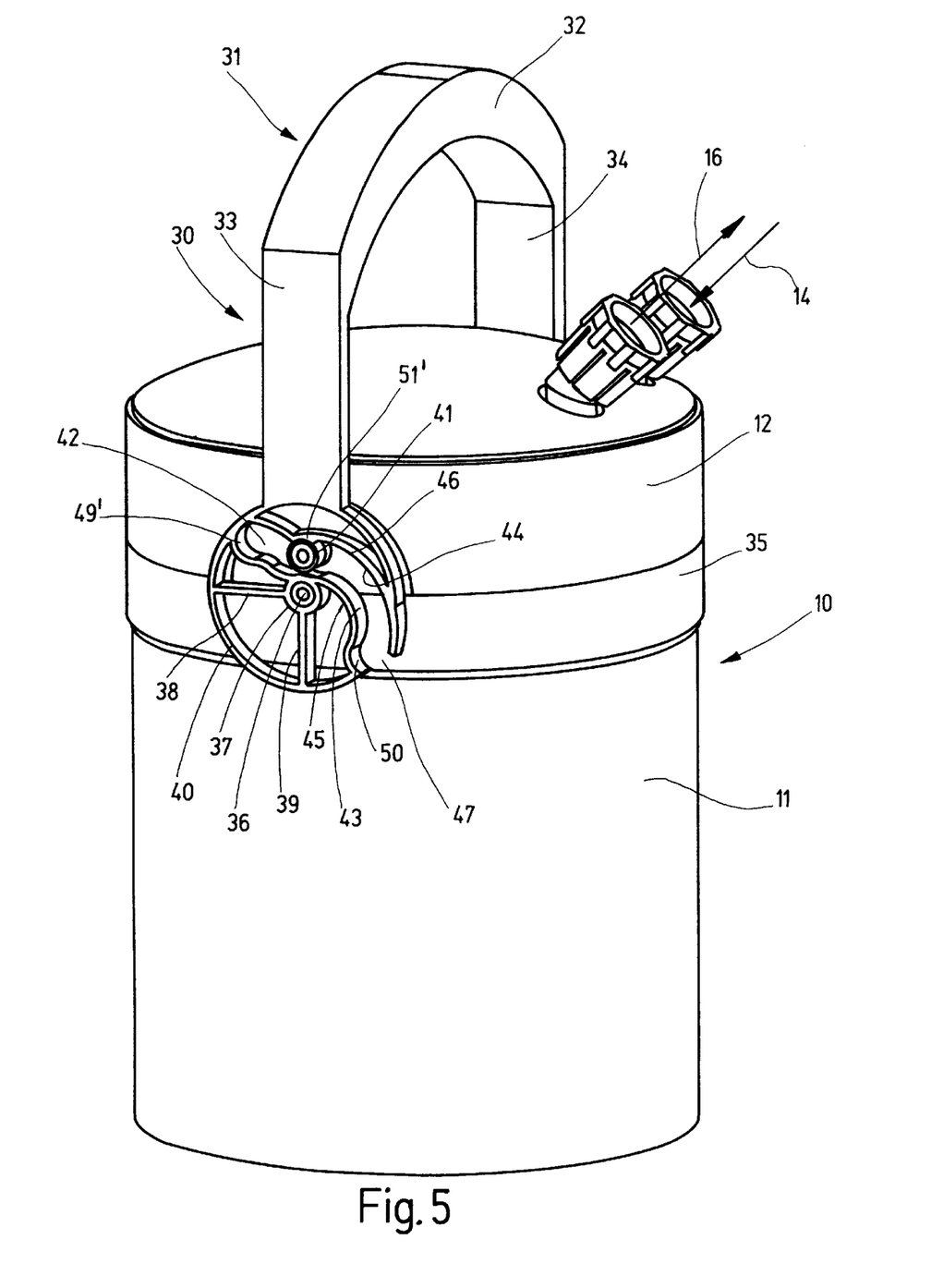
FIG. 5 is a schematic perspective view of the outside filter of FIG. 4, but with the cover located in its closing position and a bracket located in an initial position.
Figure 6:
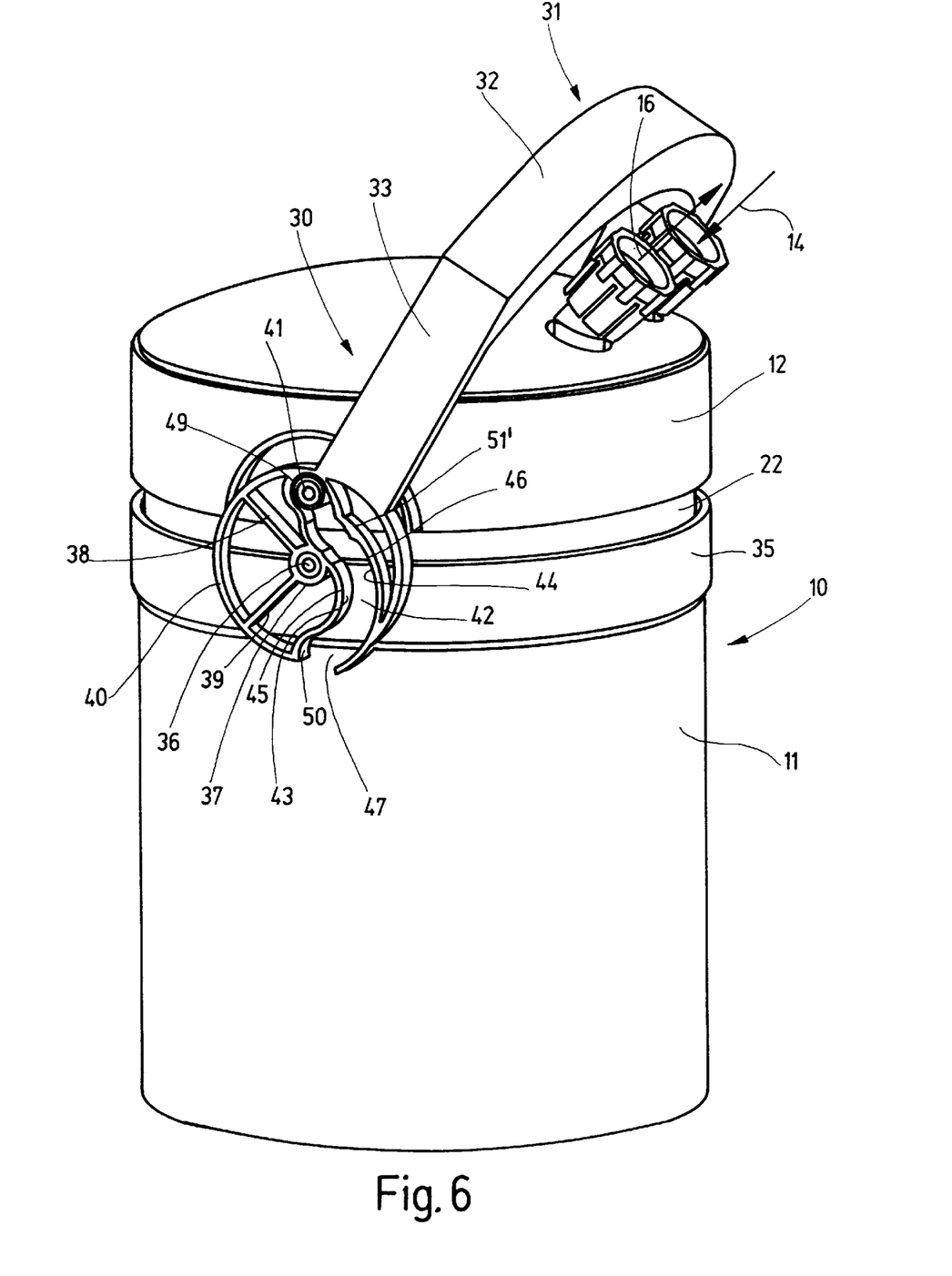
FIG. 6 is a schematic perspective view of the outside filter of FIG. 1, in which however the cover is located in another position and the bracket is located in its first end position.

In FIG. 4 the bracket is shown in its second end position which with regard to the cover 12 corresponds to the end position ready for removal. In FIG. 5 the bracket 31 is shown in its initial position, in which the cover 12 is located in the closing position. In FIG. 6 the bracket 31 is located in its first end position, in which the bracket is turned for turning to the second end position of FIG. 4, in a turning direction which is an opposite direction. This first end position in FIG. 6 corresponds to a position of the cover 12 after producing the vacuum and before lifting of the sealing condition.

The actuating device 30 of FIGS. 4–6 has an over-arrestable arresting seat 51' in both turning directions, for example in form of a depression in the lowering curve 44. The bracket 31 is blockable with it in its initial position shown in FIG. 5, which corresponds to the closing position of the cover 12. The arresting seat 51' represents thereby the arresting means which correspond to the second end abutment 51 when compared with the second embodiment in FIGS. 2, 3.

The actuating device 30 further has a second end abutment 49' provided for example at the end of the lifting curve 43 at a distance from the arresting seat 51'. It is formed for example by an arc at the end of the both webs 45, 46, in which both webs 45, 46 run in one another. The bracket 31 is blockable with the second end abutment 59' in a first end position shown in FIG. 6. During lifting and/or tilting of the cover 12 for the producing of the vacuum it corresponds to a corresponding end position of the cover 12 for lifting of the sealing condition. The end abutment 49' thereby guarantees that the bracket 31 does not turn in the clockwise direction outwardly beyond the first end position shown in FIG. 6, and thereby the sealing condition between the cover 12 and the housing 11 is undesirably lifted. The second end abutment 49, when compared with the second embodiment of FIGS. 2 and 3, represents the element which is analogous to the arresting device 48 in the construction of the abutment 49. In the third embodiment, the bracket 31 is turnable starting from the initial position of FIG. 5, in a turning direction which corresponds to the clockwise direction, by a turning angle for example in the region of substantially 30–45° to its first end position of FIG. 6 for producing the vacuum. When one considers the initial position of the bracket 31 of FIG. 5, then the bracket 31 is turnable further in an opposite turning direction, or in other words in the counter clockwise direction, by a turning angle which is greater than 90°, for example in the order of substantially 135° from the initial position of FIG. 5 to the second end position of FIG. 4 which corresponds to an end position of the cover 12 ready to be removed. It can be seen that the lifting curve 43 in the region which extends from the initial position of the lever 31 of FIG. 5 to the second end abutment 49, has such a course that the turning actuation of the bracket 31 from the initial position of FIG. 5 in a clockwise direction to the first end position of FIG. 6 produces a lifting movement of the cam 41 and thereby of the cover 12 which is sufficient for producing in the inner chamber 13 of the outside filter 10 a vacuum for aspiration of the water.

Figure 9:
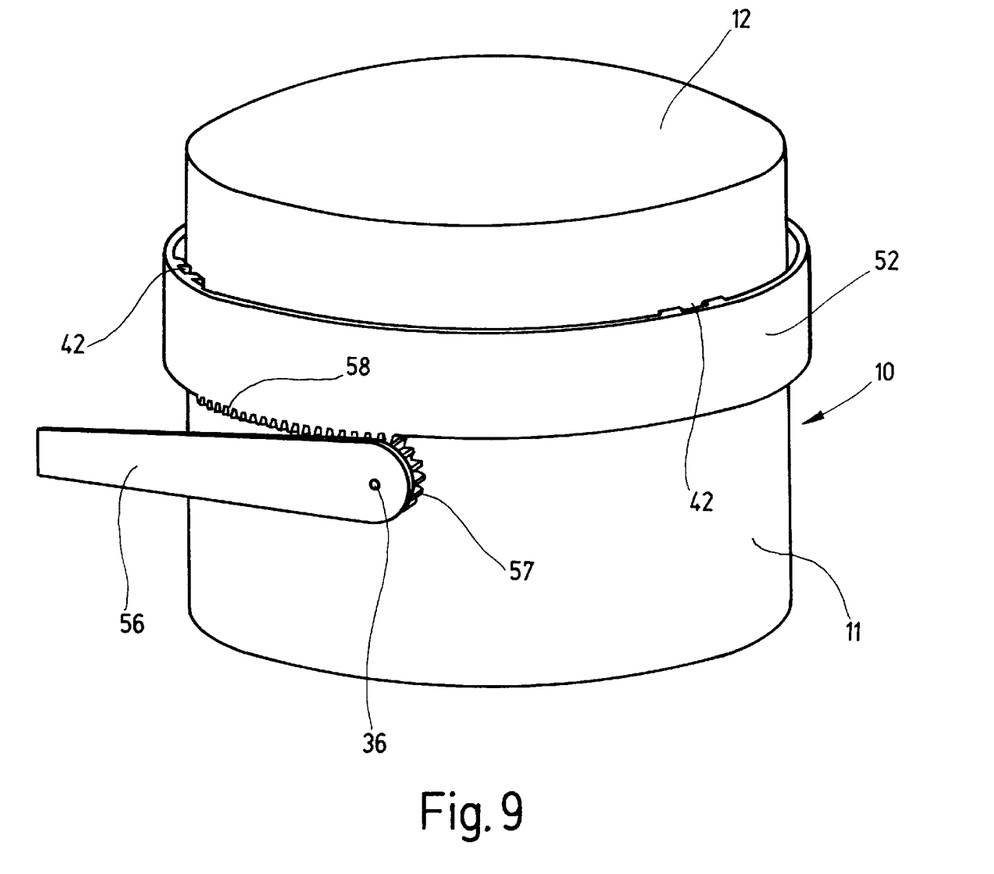
FIG. 9 is a schematic perspective view of the outside filter of FIG. 7 in which the cover is located in an end position ready to be removed.
Figures 10, 11:
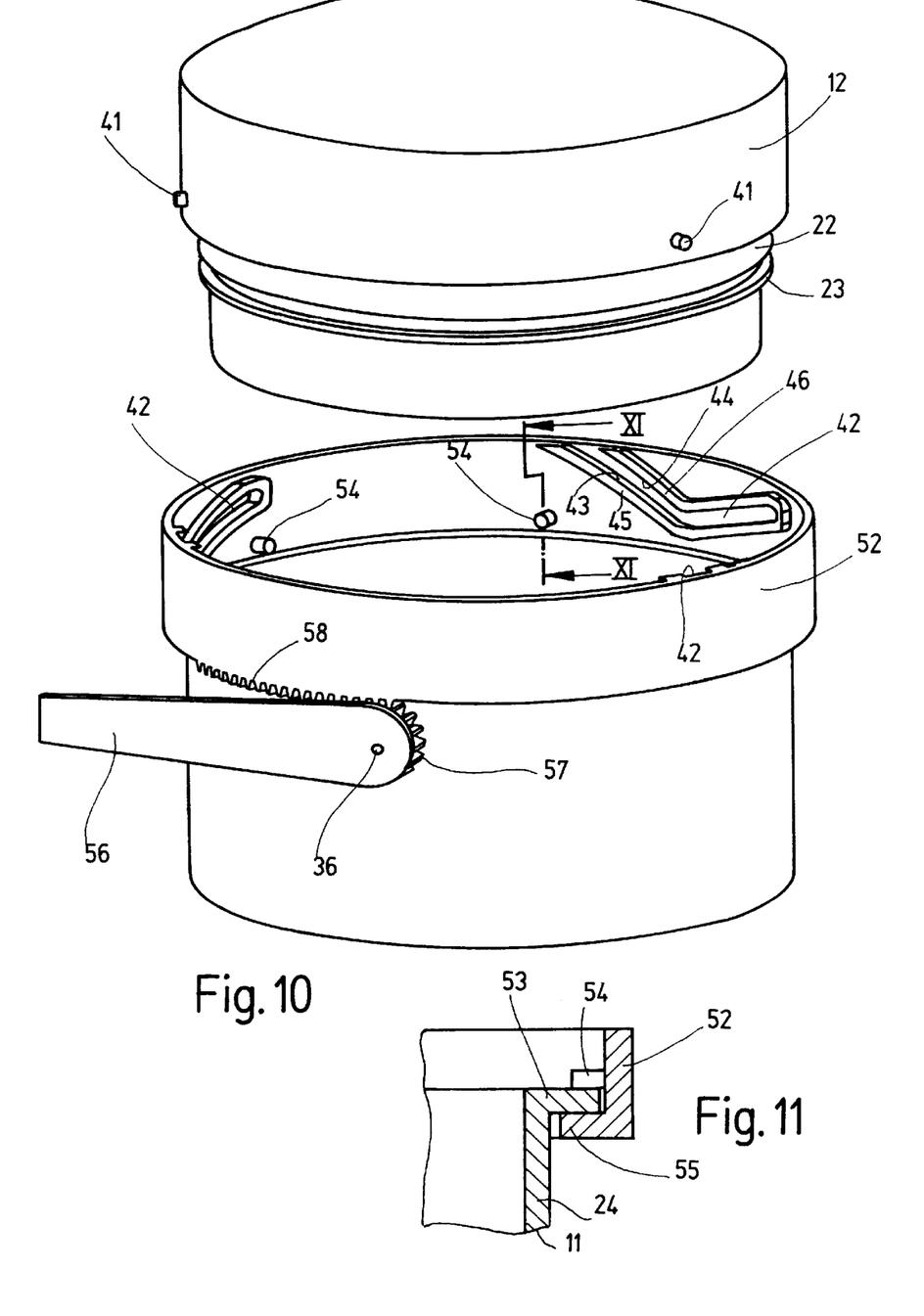
FIG. 10 is a schematic perspective view of the outside filter of FIG. 7 with the removed cover.
FIG. 11 is a schematic section taken along the line XI—XI through the outside filter of FIG. 10.

In the fourth embodiment of FIGS. 7–11 the transmission means between the cover 12 and the housing 11 include several, for example three projecting cams 41 on the one hand, as shown in FIG. 10, and a slot-shaped coulisse track 42 for each cam 41 which is engaged or engageable with the cam 41 on the other hand. Each coulisse track 42 is formed of two webs 45 and 46 with the lifting curve 43 and the lowering curve 44 as shown in FIG. 10. The cams 41 are located outside of the cover 12, while the associated coulisse tracks 42 are provided on a ring 52. The ring is held on the housing 11 non releasably, and at the same time turnably. The cams 41 project outwardly on the cover 12. The associated coulisse tracks 42 are located on the inner side of the ring 52.

It is to be understood that in another not shown embodiment, the construction can be kinematically reversed. In other words, the coulisse tracks 42 can be a part of the cover 12, while the cams 41 can be a part of the ring 52.

The ring 52 is held on the upper edge 53 of the housing 11, so that the ring 52 is downwardly secured from pulling out upwardly and from turning and from displacement. The securing against displacement is provided by inwardly projecting pins 54 on the ring 52, which abut against the upper side of the edge 53. The securing against the pulling out upwardly is provided by individual, transversely extending projections or a circumferential flange 55 on the lower edge of the ring 52, which abuts for example from below against the edge 53. A sufficient distance is provided between the pins 54 and the flange 55 for free rotation of the ring 52 relative to the edge 53.

The ring 52 is removable manually or in a shown embodiment by a handle 56. The handle is formed as a lever which is turnably supported in the housing 11 around a turning axis 36, and is rotatably actuatable. The handle 56 has a fixed toothed gear 57, a tooth segment and the like, which engages with a curved row of teeth 58. The teeth 58 are designed as a tooth rack, and is located for example on the lower side of the ring 52 facing the tooth gear 57.

Figure 7:
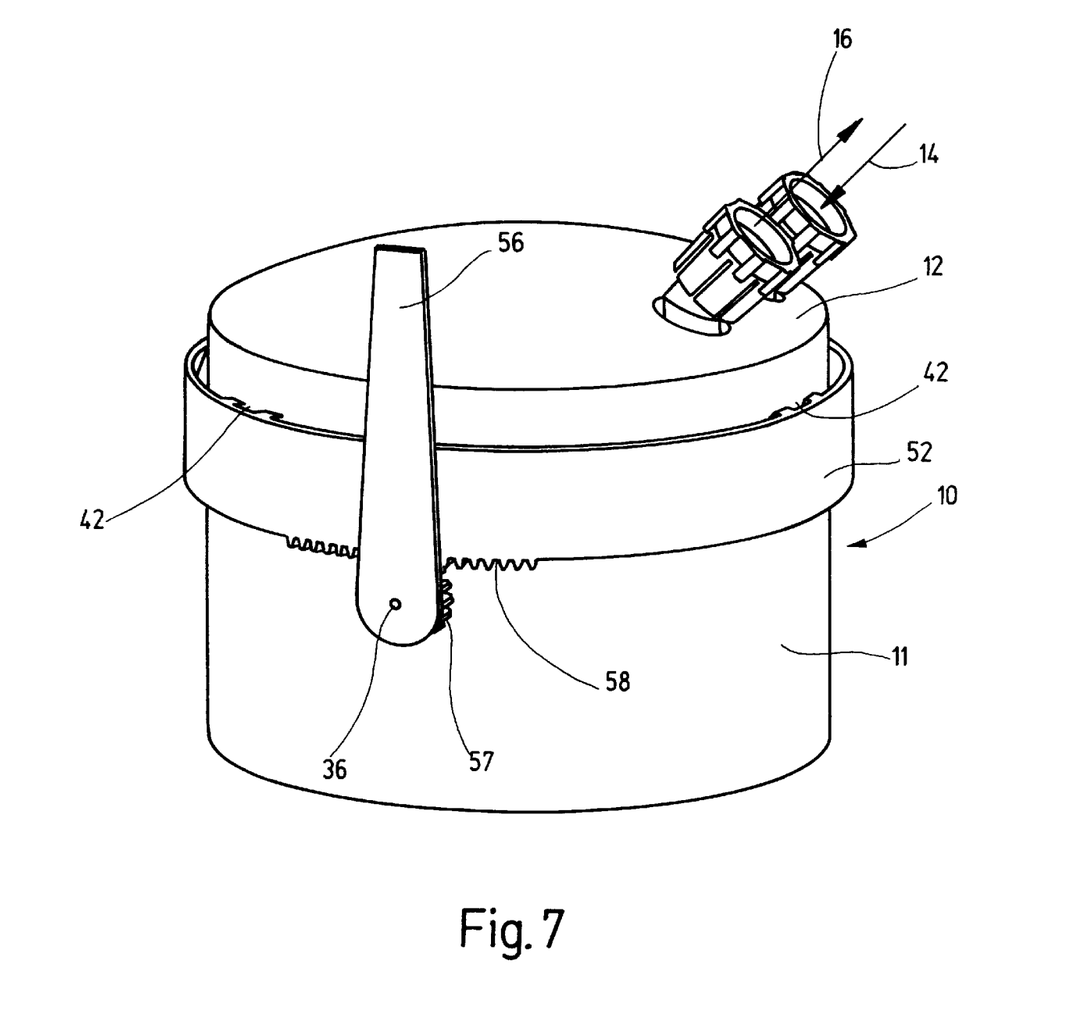
FIG. 7 is a schematic perspective view of an outside filter in accordance with a fourth embodiment of the present invention, wherein the cover is located in its closing position.
Figure 8:
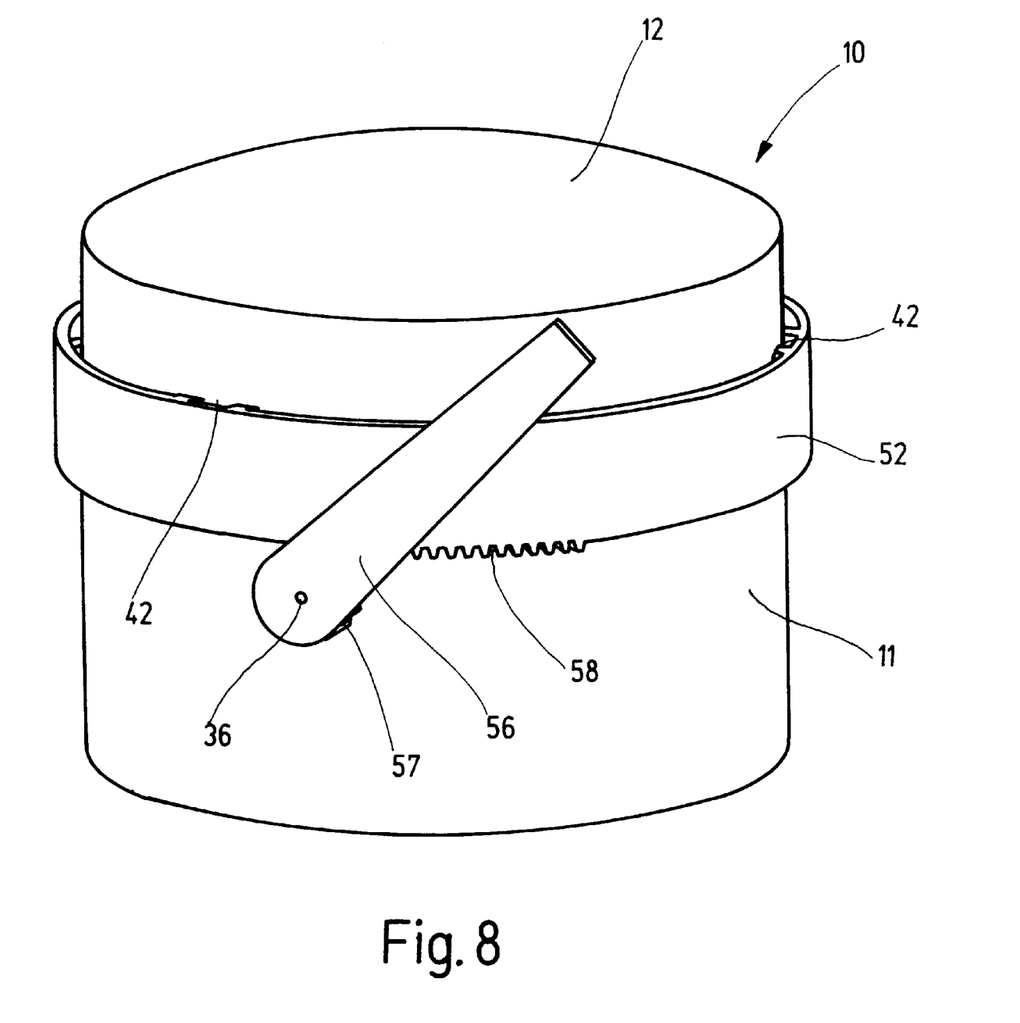
FIG. 8 is a schematic perspective view of the outside filter of FIG. 7, in which however the cover is located in a lifted position.

FIG. 7 shows a condition in which the handle 56 is located in the initial position and the cover 12 is located in the closed position. In the position shown in FIG. 8, the handle 56 is located in its first end position after turning in clockwise direction around the turning axis 35. The cover 12 is located here in an end position after producing of the vacuum and before lifting of the sealing position between the cover 12 and the housing 11. FIG. 9 shows a condition in which the handle 56 assumes its second end position in which the cover 12 is located in its end position ready to be removed, so that the cover 12 can be removed upwardly as shown in FIG. 10.

It will be understood that each of the elements described above, or two or more together, may also find a useful application in other types of constructions differing from the types described above.

While the invention has been illustrated and described as embodied in outside filter, in particular for aquarium, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A closed system comprising an outside filter for an aquarium, comprising a housing having an inner chamber, a removable cover for closing said inner chamber of said housing; a supply conduit for supplying water to be filtered into said inner chamber of said housing; a discharge conduit for withdrawing the water from said inner chamber of said housing, a motor-operated pump for withdrawing the filtered water; and a device operable for producing a vacuum for aspirating water into said supply conduit by displacement of air contained in a system that is formed by said inner chamber of said housing together with said discharge conduit which communicates with said supply conduit, said system being hermetically sealingly closed from outside and serving as an evacuatable pressure chamber during the production of vacuum, said device being formed so as to produce the vacuum inside said closed system, said device for producing a vacuum being comprised of parts of said outside filter.

2. An outside filter as defined in claim 1, wherein said device is formed for producing the vacuum inside said inner chamber of said housing.

3. An outside filter as defined in claim 1, wherein said device is formed for producing the vacuum inside said supply conduit.

4. An outside filter as defined in claim 1, wherein said device is formed for producing the vacuum inside said inner chamber of said housing and said supply conduit.

5. An outside filter as defined in claim 1, wherein said discharge conduit has a valve which blocks said discharge conduit during actuation of said device for producing the vacuum and releases said discharge conduit after aspiration of water into the supply conduit.

6. An outside filter as defined in claim 5, wherein said valve is an automatically operating valve.

7. An outside filter as defined in claim 6, wherein said valve is a check valve.

8. An outside filter as defined in claim 5, wherein said valve is a manually actuatable valve.

9. An outside filter as defined in claim 1, wherein said housing has one part which is movable relative to another part of said housing for producing a vacuum.

10. An outside filter as defined in claim 9, wherein one part of said housing is movable as a pump piston.

11. An outside filter as defined in claim 1, wherein said housing has at least one part which is movable relative to said cover for producing a vacuum.

12. An outside filter as defined in claim 11, wherein said at least one part of the housing is movable as a pump piston.

13. An outside filter as defined in claim 1, wherein said cover has at least one part which is movable relative to said housing for producing a vacuum.

14. An outside filter as defined in claim 13, wherein said at least one part of said cover is movable as a pump piston.

15. An outside filter as defined in claim 1, wherein said cover as a whole is movable relative to said housing for producing a vacuum.

16. An outside filter as defined in claim 15, wherein said cover is movable as a pump head.

17. An outside filter as defined in claim 1, wherein said cover is liftable for producing a vacuum.

18. An outside filter as defined in claim 1, wherein said cover is at least insignificantly inclinable for producing a vacuum.

19. An outside filter as defined in claim 1, wherein said cover is at least insignificantly tiltable for producing a vacuum.

20. An outside filter as defined in claim 1; and further comprising means forming a ventilating opening, wherein said cover has a part which in a position for producing the vacuum ventilating said inner chamber of said housing outwardly through said ventilating opening.

21. An outside filter as defined in claim 20, wherein said ventilating opening is formed in said cover.

22. An outside filter as defined in claim 20, wherein said ventilating opening is formed in a wall of said housing.

23. An outer filter for an aquarium, comprising a housing having an inner chamber; a removable cover for closing said inner chamber of said housing; a supply conduit for supplying a water to be filtered into said inner chamber of said housing; a discharge opening for discharging a filtered water; a motor-operated pump for discharging the filtered water through said discharge opening; and an actuating device engaging said cover, said actuating device operable for opening said cover so as to be movable outside of said housing, said actuating device closing said cover to provide sealing condition inside said housing and also holding said cover in a closed position, said actuating device also operable for producing a vacuum formed in part by said housing inner chamber.

24. An outside filter as defined in claim 23, wherein said actuating device has a bracket which is turnably supported on said housing about a turning axis and engaging said cover with a distance therebetween.

25. An outside filter as defined in claim 24, wherein said actuating device has arresting means for arresting said bracket in a first end position operable for lifting or at least insignificantly inclining said cover and for producing the vacuum corresponding to an end position of said cover before lifting of the sealing condition.

26. An outside filter as defined in claim 25, wherein said arresting means is formed as an over arresting abutment of a lifting curve.

27. An outside filter as defined in claim 24, wherein said bracket starting from an initial position is turnable first in a turning direction to a first end position, and from the latter in a same turning direction to a second end position, as well as in an opposite turning direction back to said initial position.

28. An outside filter as defined in claim 27, wherein said bracket is turnable over a turning angle which is greater than 90°.

29. An outside filter as defined in claim 28, wherein said bracket is turnable over a turning angle of substantially 135°.

30. An outside filter as defined in claim 27, wherein said actuating device has an arresting seat which is over arrestable in both turning directions, said arresting seat blocking said bracket in its initial position which corresponds to a closing position of said cover.

31. An outside filter as defined in claim 30, wherein said arresting seat is formed as a depression in a lifting curve.

32. An outside filter as defined in claim 30, wherein said actuating device has a second end abutment which is located at a distance from said arresting seat and blocks said bracket in a first end position, said first end position operable for lifting or at least insignificantly inclining of said cover and for producing the vacuum corresponding to an end position of said cover before lifting of the sealing condition.

33. An outside filter as defined in claim 32, wherein said bracket is turnable from its initial position in the turning direction to a first end position for producing the vacuum.

34. An outside filter as defined in claim 33, wherein said bracket is turnable over a turning angle of approximately 30–45°.

35. An outside filter as defined in claim 33, wherein said bracket starting from its initial position is turnable in an opposite turning direction by an angle greater than 90° to its second end position which corresponds to an end position of said cover ready to be removed.

36. An outside filter as defined in claim 35, wherein said bracket is turnable in the opposite turning direction by a turning angle of approximately 135°.

37. An outside filter as defined in claim 23; and further comprising transmission means provided between said cover and said housing.

38. An outside filter as defined in claim 23, wherein said actuating device is formed so that it simultaneously serves for lifting of said cover and for producing the vacuum.

39. An outside filter as defined in claim 23, wherein said actuating device is formed so that it simultaneously serves for at least insignificantly inclining of said cover and for producing the vacuum.

40. An outer filter for an aquarium, comprising a housing having an inner chamber; a removable cover for closing said inner chamber of said housing; a supply conduit for supplying a water to be filtered into said inner chamber of said housing; a discharge opening for discharging a filtered water; a motor-operated pump for discharging the filtered water through said discharge opening; and an actuating device engaging said cover, said actuating device operable for opening said cover so as to be movable outside of said housing and closing said cover to provide a sealing condition inside said housing and also holding said cover in a closed position; said actuating device comprising transmission means provided between said cover and said housing, said transmission means including cams and associated coulisse tracks.

41. An outer filter for an aquarium, comprising a housing having an inner chamber; a removable cover for closing said inner chamber of said housing; a supply conduit for supplying a water to be filtered into said inner chamber of said housing; a discharge opening for discharging a filtered water; a motor-operated pump for discharging the filtered water through said discharge opening; and an actuating device engaging said cover, said actuating device operable for opening said cover so as to be movable outside of said housing, and closing said cover to provide a sealing condition inside said housing and also holding said cover in a closed position; said actuating device comprising a bracket and also comprising and transmission means provided between said cover and said housing, said transmission means including at least two cams and for each of said cams a lifting curve arranged at a distance from said axis of said bracket and a lowering curve arranged at a distance from said lifting curve and engaging with a respective one of said cams, said lifting curve and said lowering curve being provided on one element selected from the group consisting of said bracket and said cover, while said cams are provided on another element of the group consisting of said bracket and said cover.

42. An outside filter as defined in claim 41, wherein said cams are formed as rollers.

43. An outside filter as defined in claim 41, wherein said actuating device has a first end abutment with which said bracket is blocked in a second end position, which corresponds to an end position of said cover in which it is ready for withdrawal following a lifting or at least insignificant inclination of said cover.

44. An outside filter as defined in claim 43, wherein said lowering curve ends at a distance from said first end abutment, and an intermediate space is formed therebetween for introduction of said cam.

45. An outside filter as defined in claim 44, wherein said end abutment is provided at an end of said lifting curve.

46. An outside filter as defined in claim 44, wherein said actuating device has a second end abutment with which said bracket is blockable in an initial position which corresponds to the closing position of said cover.

47. An outside filter as defined in claim 41, wherein at least one of said lifting curve and said lowering curve is formed on a substantially arcuate web which is a solid part of said bracket.

48. An outside filter for an aquarium, comprising a housing having an inner chamber, a removable cover for closing said inner chamber of said housing; a supply conduit for supplying water to be filtered into said inner chamber of said housing; a discharge conduit for withdrawing the water from said inner chamber of said housing, a motor-operated pump for withdrawing the filtered water; and a device operable for producing a vacuum for aspirating water into said supply conduit by displacement of air contained in a system that is formed by said inner chamber of said housing together with said discharge conduit which communicates with said supply conduit, said system being hermetically sealingly closed from outside and serving as an evacuatable pressure chamber during the production of vacuum, said device being formed so as to produce the vacuum inside said closed system; and said device comprising transmission means provided between said cover and said housing and including a plurality of cams and for each cam a substantially slot-shaped coulisse track provided with a lifting and a lowering curve for engagement with a respective one of said cams, said cams being provided on one element selected from the group consisting of said cover and a ring rotatably held on said housing, while said coulisse tracks are provided on another of said elements selected from the group consisting of said cover and said ring.

49. An outside filter as defined in claim 48, wherein said cams outwardly project from said cover, said coulisse tracks being provided on an inner side of said ring.

50. An outside filter as defined in claim 49; and further comprising a handle with which said ring is rotatably actuatable.

51. An outside filter as defined in claim 50, wherein said handle is formed as a lever which is turnably supported on said housing.

52. An outside filter as defined in claim 51, wherein said handle has a fixed toothed member which is engaged with a curved tooth row of said ring, on an associated lower side of said ring.

53. An outside filter as defined in claim 52, wherein said tooth element is formed as an element selected from the group consisting of a toothed gear and a toothed segment.

54. An outside filter as defined in claim 48, wherein said ring is rotatably actuatable by hand.

55. An outside filter as defined in claim 48, wherein said ring is held on an upper edge of said housing non releasably and rotatably.

56. An outside filter for an aquarium, comprising a housing having an inner chamber, a removable cover for closing said inner chamber of said housing; a supply conduit for supplying water to be filtered into said inner chamber of said housing; a withdrawal conduit for withdrawing the water from said inner chamber of said housing, a motor-operated pump for withdrawing the filtered water; and a device operable for producing a vacuum for aspirating water into said supply conduit by displacement of air contained in a system that is formed by said inner chamber of said housing together with said discharge conduit which communicates with said supply conduit, said system being hermetically sealingly closed from outside and serving as an evacuatable pressure chamber during the production of vacuum, said device being formed so as to produce the vacuum inside said closed system, said device for producing a vacuum being comprised of parts of said outside filter movable relative to one another and forming a pump.

\* \* \* \* \*